United States Patent [19]

Shea et al.

[11] Patent Number: 5,690,421

[45] Date of Patent: Nov. 25, 1997

[54] DISPLAY LIGHTING WITH MATCHED NARROW BAND FILTER AND LIGHT SOURCE

[75] Inventors: Michael Joseph Shea, Salem; Jakob Maya, Brookline; John Francis Waymouth, Marblehead, all of Mass.

[73] Assignee: Matsushita Electric Works R&D Lab, Woburn, Mass.

[21] Appl. No.: 533,163

[22] Filed: Sep. 25, 1995

[51] Int. Cl.⁶ .................................................. F21V 9/00
[52] U.S. Cl. .................... 362/293; 362/231; 340/815.41; 340/815.56
[58] Field of Search ........................ 362/83.3, 293, 362/230, 231; 340/815.41, 815.49, 815.55, 815.56, 815.73, 815.75, 815.76, 908; 359/885, 580, 581, 589

[56] References Cited

U.S. PATENT DOCUMENTS

| 2,403,685 | 7/1946 | Sachtleben et al. | 340/815.41 |
| 4,214,168 | 7/1980 | Kulka et al. | 362/83.3 |
| 5,448,461 | 9/1995 | Fast et al. | 362/293 |

Primary Examiner—Ira S. Lazarus
Assistant Examiner—Sara S. Raab
Attorney, Agent, or Firm—Jerry Cohen

[57] ABSTRACT

A narrow band light source is combined with a narrow band filter on the face of a traffic light to reduce the problem of sun glare reflected from one traffic light, reducing intensity of the sunlight glare while light from the narrow band source passes through the filter essentially unattenuated, allowing system efficiency to remain high.

13 Claims, 3 Drawing Sheets

DISPLAY LIGHTING WITH MATCHED NARROW BAND FILTER AND LIGHT SOURCE

BACKGROUND OF THE INVENTION

The field of the invention relates to lamps used in conjunction with colored filters and more particularly to traffic lights.

Traffic lighting relies on producing light of different colors to give instructions to automobile operators. These traffic lights most commonly use incandescent bulbs behind red, green, and yellow filters. An incandescent bulb has a broad, black body spectrum that mixes all of the traffic signal colors together to form white light. The colored filters absorb undesired colors from the incandescent lamp's spectral output to yield the specified traffic signal colors. For example, the red filter absorbs the yellow, green, and blue light from the incandescent lamp to make a red signal.

Sunlight, generally near the time of sunrise and sunset, may strike the face of the traffic fixture at an angle that reflects the light to the observer. The sunlight penetrates the filter, is reflected from the inside of the fixture, and exits by passing once again through the filter. Because the incandescent and solar spectra are very similar, the filters cause the reflected sunlight to take on the color of the filters, just as it does for the incandescent source. Under these circumstances of sun glare, all three traffic lights, the red, green, and yellow, appear to be on. This is a source of confusion to motorists who have difficulty judging what course of action is specified by the traffic light. Even though one traffic light of one color is on at all times, the contrast with the glare from the lights of the two other colors is not enough to make a reliable distinction.

A common method of reducing this glare is to provide the traffic light fixture with a hood that shields each filter from the sunlight. A metal baffle is arranged directly above each color of traffic light, casting a shadow upon it. This method is of limited benefit because it depends on the direction of the sun, which changes hourly and seasonally. And when the sun is low on the horizon, the situation giving rise to the worst sun glare, the overhanging baffle casts a minimal shadow on the traffic light. In addition, many traffic lights are rigged such that they sway when the wind blows. The hood cannot block the sunlight at all of the positions that the swaying traffic light assumes, and this allows glare. In addition reading letters such as "GO" and "STOP" as well as distinguishing arrows (both their direction and their color) becomes difficult under such circumstances.

Other methods have been used to reduce glare. One method is to use a screen of alternating opaque and transmissive material. This operates by preventing the sunlight from entering the traffic light's reflector by either absorbing the light or scattering it at an angle away from the viewer. This is little different from the concept of the hood described above, except that it forms a smaller, less angle sensitive mask over the face of the traffic light. A shortcoming of this method is that it inherently blocks a portion of the desired lamp light from exiting the fixture as well, lowering the efficiency of the system. Indeed, as its ability to prevent glare is increased, its transmission of desired lamp light necessarily decreases.

Another method is to use a polarizer. If a polarization filter is placed over the face of the traffic light, the intensity of the glare source will be reduced by an amount that depends on its degree and direction of polarization. If the source of glare is unpolarized, as is direct sunlight, it will be attenuated by 50% after one pass through the filter. The liability of this method is that the intensity of the desired light, if generated by an unpolarized source such as an incandescent lamp, will also be reduced by 50%.

Another method of reducing sun glare is to angle the front surface of the traffic light fixture. This reflects the sunlight's first surface reflection away from the viewer. Its failing is that it does not prevent glare from the component of sunlight that is transmitted through the front glass and reflected by the reflector back to the observer. This component is the dominant source of glare, and eliminating the front surface reflection is of minimal value.

Another method of limiting sun glare is to use light emitting diodes (LEDs) instead of the traditional traffic light and its fixture. The LEDs are largely transparent, and the sunlight is transmitted to a nonreflecting surface, forming a very effective method of reducing glare. The limitation of this approach is cost, with bright blue LEDs being particularly costly.

Another method is to use a shutter over the traffic lights that are not illuminated. The sunlight strikes an absorbing layer covering the nonilluminated signals, preventing glare. The shortcomings of this method are expense and field reliability.

Accordingly, a principal object of the present invention is to provide a means of reducing glare from the sun and other sources for traffic lights and other lighting displays.

In addition to the glare problem, it is well known that traffic lights utilizing incandescent bulbs are notoriously inefficient, leading to very high electricity consumption. Also, they have a very short lifetime, and therefore one has a considerable maintenance cost because the bulbs have to be changed frequently. Shifting from an incandescent source to a more energy efficient electrical discharge source, such as fluorescent or high pressure discharge (HID) can improve the energy efficiency as well as increase the lifetime of the system and therefore reduce the maintenance costs. Typically the fluorescent light sources have anywhere from 10 to 20 times the lifetime of incandescent sources and the efficiency is anywhere between four to eight times the efficiency of an incandescent source. However, fluorescent sources have a major drawback in that the performance of the source is ambient temperature dependent. Therefore, at very cold ambient temperatures, since the mercury pressure is very low, the light output would be substantially lower than say the performance at 25° C. ambient temperature. As a result, in order to make a fluorescent source work, one would have to provide a heater to the light source that is sensitive to the ambient temperature. This could be accomplished in a very simple manner with a sensor and feedback loop in such a manner than when the temperature drops below a certain point the heater is activated, providing the necessary heat to raise the pressure of the mercury in the fluorescent lamp and thereby give sufficient luminosity to meet the required standards. It is possible to combine the reduction of glare in the present invention with the energy efficiency and improved lifetime mentioned above to result in a superior lighting system for traffic signals. Indeed the present invention provides a narrow band radiation and one of the options for this narrow emission is certainly a phosphor that can be activated by a UV source which is the essence of a fluorescent lamp. Similarly, one could use a high pressure discharge source with substantial radiation in a specified band of the spectrum. The susceptability of high intensity discharge sources to ambient temperatures is much less and therefore one could avoid the heating that is required in fluorescent sources. It is therefore a further object of the present invention to enable replacement of incandescent bulbs and avoidance of their known drawbacks while also overcoming the ambient temperature dependence of fluorescent sources.

It is also an object of this invention to provide a more energy efficient traffic light source compared to incandescent lamps.

It is a further object of this invention to provide a traffic light source that has a much longer lifetime than an incandescent lamp so as to reduce the maintenance costs of these systems.

It is still a further object of this invention to provide an economical system overall such that the payback period for new installations is relatively short.

SUMMARY OF THE INVENTION

The invention meets the foregoing objects through provision of a narrow band filter and a narrow band light source. The narrow band filter absorbs the visible spectrum except in a narrow region, e.g., 30 nm wide, where it allows the light to pass through. The narrow band source emits the preponderance of its light in a single line that has a width comparable to that of the narrow band filter and centered at the same wavelength. The narrow band filter provided in this invention occupies the position of the current broad band filter on a traffic light, and the narrow band source replaces the incandescent lamp.

Another object of the present invention is to provide a traffic light fixture without glare at all times and in all weather conditions.

Other objects, features and advantages will be apparent from the following detailed description of preferred embodiments taken in conjunction with the accompanying drawings in which:

DETAILED DESCRIPTION OF THE PREFERRED EMBODIMENTS

Figure 1:
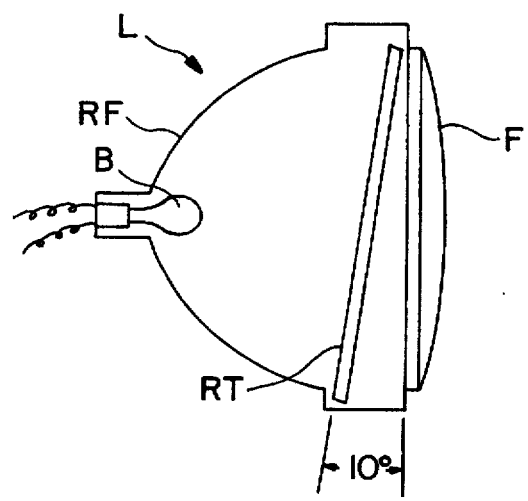
FIG. 1 is a cross-sectional view of a traditional traffic light, including lamp, reflector, reticule, and filter components used both to refer to prior devices and to modifications made pursuant to a preferred embodiment of the present invention.
Figure 1A:
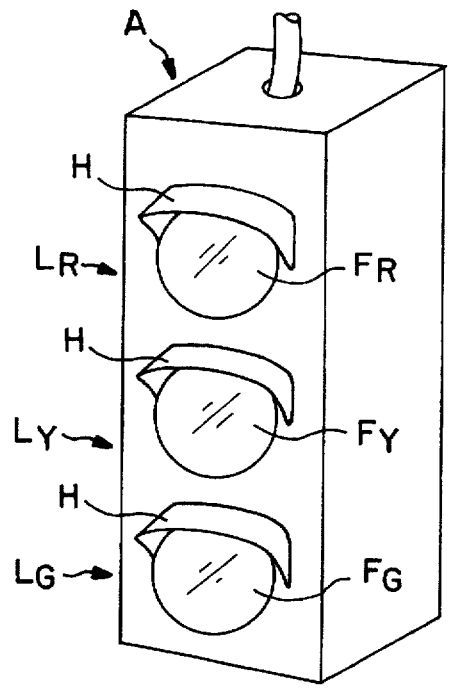
FIG. 1A is an isometric view of a typical multi-light traffic signal comprising an assembly of FIG. 1 lights with red, yellow and green filters.

FIG. 1 shows the construction of a traffic light fixture (light) L. The device has an enclosure formed of a large, shiny, metal reflector RF and a filter which fills a light entry/exit aperture. An incandescent bulb B is housed inside the reflector at the focus such that the light emitted from the bulb via the aperture is emitted in a forward direction. A reticule RT, which is a plastic insert composed of many tiny molded lenses, is fastened onto the reflector. It has a 10° downward slant from the vertical. Enclosing the fixture's face is the color filter F. For traffic applications, three of these lights (Lr, Ly, Lg) are combined (FIG. 1a) in an assembled unit A, with separate red, yellow, and green filters (Fr, Fy, Fg) for these lights. Hoods H are provided. In practice two lights may be provided (red, green) or more than three (e.g. four or five with extra green directional lights in addition to the basic red, yellow, green).

Figure 2:
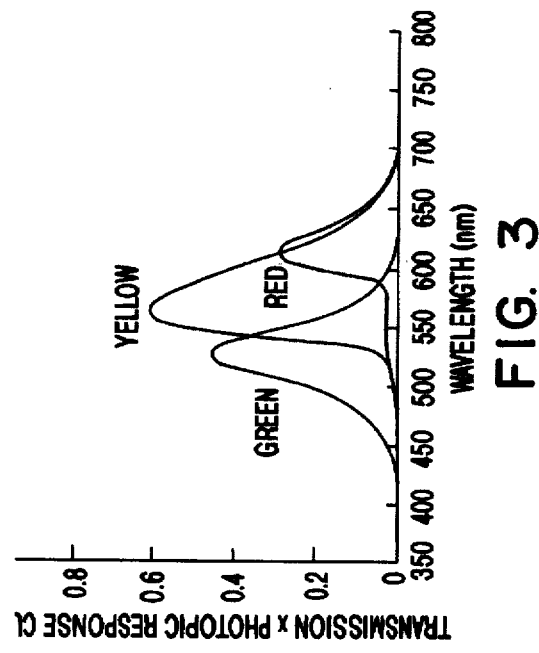
FIG. 2 is a plot of measured transmission curves of the red, green, and yellow filters.
Figure 3:
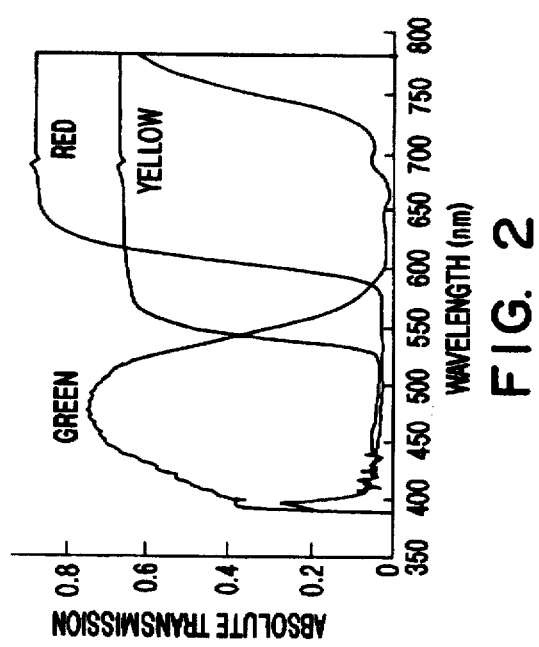
FIG. 3 is a plot of the measured transmission curves of the red, green, and yellow filters convoluted with the photopic response curve of the human eye.
Figure 4:
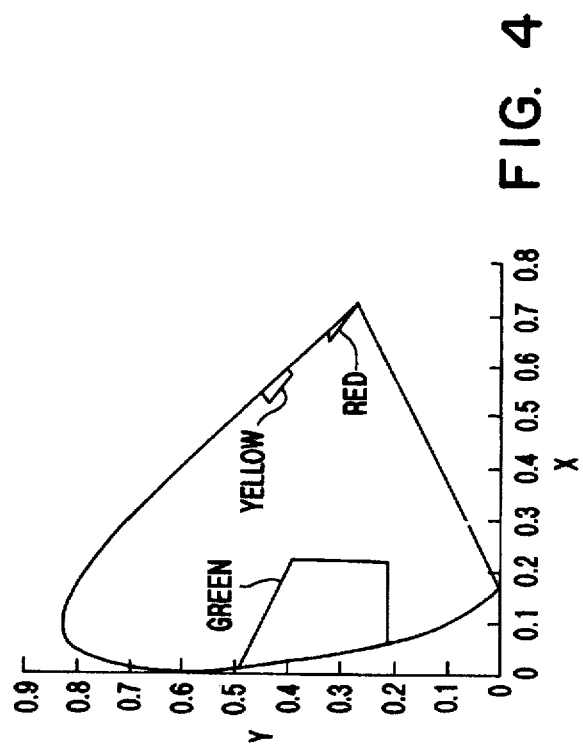
FIG. 4 is an x-y plot of chromaticity coordinates which shows the allowed chromaticity regions for red, green, and yellow traffic lights.

FIG. 2 shows the measured transmission curves for the red, yellow, and green traffic light filters using a TS70R incandescent bulb. Basic output curves (not shown) were established and divided by the spectrum of the unfiltered incandescent lamp to yield the transmissions. Each of the filters was a relatively broad band filter as indicated below. In FIG. 3, the same transmission curves have been multiplied by the human eye's photopic response curve. The eye itself acts as a filter, and these curves show the transmissions as a human observer would perceive them. Specifically, this regards the source lamp bulb with a single pass through the filters. Each color peaks at a different wavelength. The green and red filters have a band pass FWHM (full width at half maximum) of about 50 nm, while the yellow filter has a band pass of about 75 nm. Each of these filters was chosen such that the light from an incandescent bulb, upon passing through the filters, yields light of the proper color. The proper colors are defined in terms of x and y chromaticity coordinates, and the accepted regions are displayed in FIG. 4. A traffic signal's lights must meet these color criteria. The allowed chromaticity domains for green, yellow and red are all adjacent to the border of the chart, which represents pure, single line colors. Thus this allows the use of single line emitters.

Figure 5:
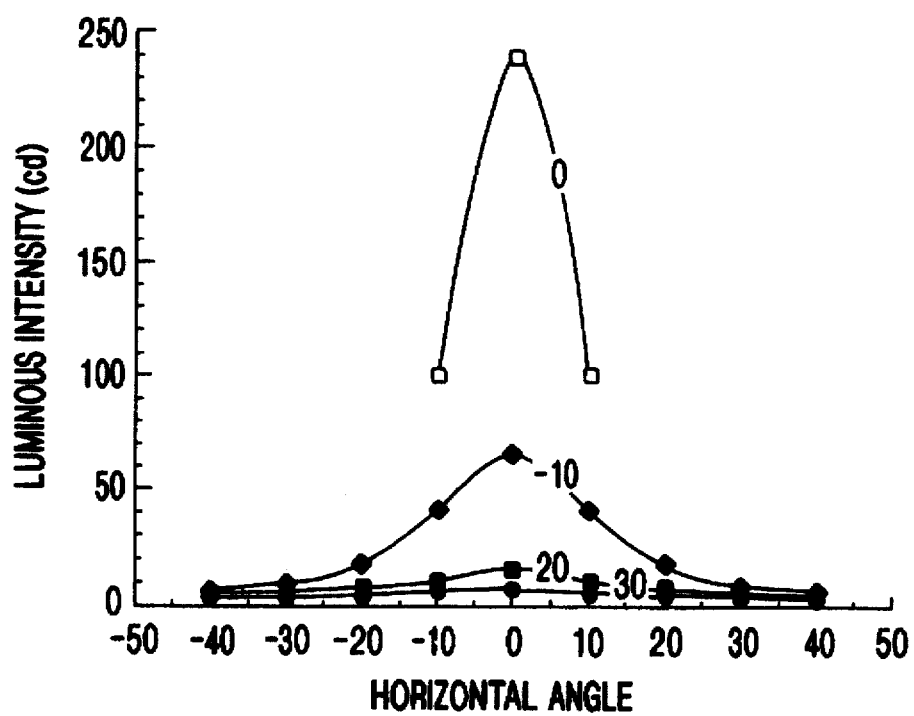
FIG. 5 is an intensity vs. horizontal angle plot which shows the required minimum angular distribution of luminous intensity for traffic lights.

FIG. 5 shows the minimum required luminous intensities from the traffic lights for various viewing angles. The x-axis plots horizontal angle, and the individual curves on the graph are labeled with the vertical angle of observation. The convention here is that 0° vertical is normal to the lens of the traffic light. This lens is tilted to 10° below the horizontal, as shown in FIG. 1. The invention does not fundamentally alter the angular distribution of the light. The light source is still placed at the focus of the reflector, and the narrow band filter is still an absorbing filter that is not sensitive to angle of incidence or viewing angle.

Figure 6:
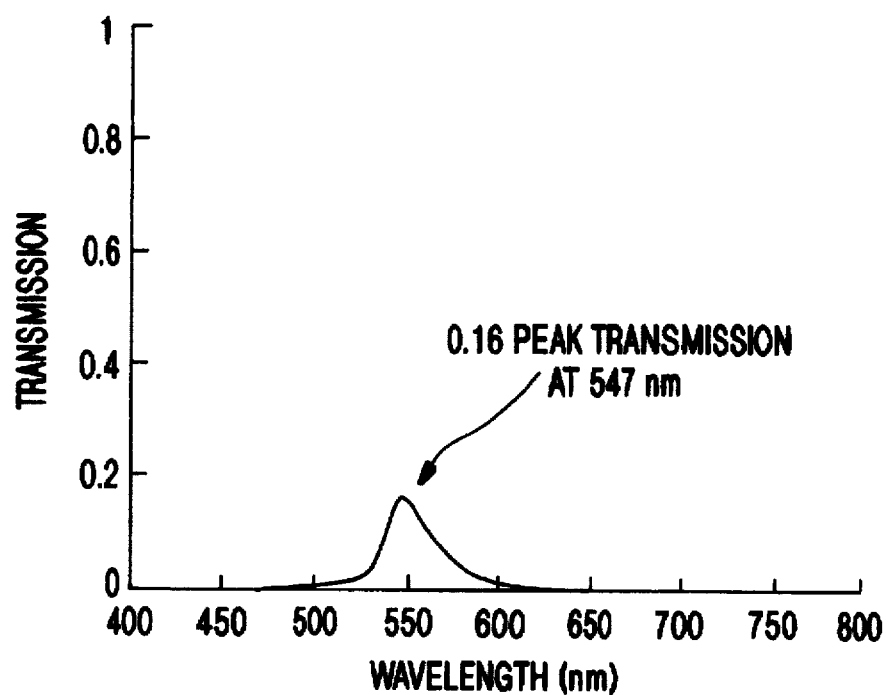
FIG. 6 is an anticipated transmission plot which shows the transmission curve of the narrow band filter convoluted with the human eye's photopic response curve to be used according to a preferred embodiment of the present invention.

The improvements in glare reduction may now be discussed as modifications of the standard traffic light as described above. A traffic light fixture, which appears in FIG. 1, was modified in two ways: the broad band light source was replaced with a narrow band source, and the broad band filter was replaced with a narrow band filter that matched the source. The transmission spectrum of the narrow band green filter, with the photopic response curve folded in, appears in FIG. 6. Its peak is centered at 548 nm with a FWHM of 30 nm. Its peak transmission is 16%, but filters may be found that approach unity transmission. Finding a more efficient filter provides no technological obstacle. For comparison, the existing green filter peaks at 529 nm and has a FWHM of 55 nm. It has a transmission of 46%. For purposes of comparing sun glare, the transmission of the narrow band filter will be normalized to that of the broad band filter. With this correction, a narrow band source matched to either filter's peak transmission would yield the same luminous intensity when placed behind either filter, and the system's efficiency would be identical. Although a FWHM of 30 nm is stated above as typical for enhanced traffic lights, filters with FWHM less than 55 nm, or narrower than the current design, are usable for light display systems within the scope of the present invention.

The reduction in band pass is central to the reduction of sun glare. The filter should be transmissive over as narrow as possible a wavelength region without blocking a significant portion of the lamp's light. This way it will reject as much sunlight as possible while preserving the system's efficiency. In this case an absorbing filter was used. In general, any kind of filter may be used, including multilayer interference filters. The sunlight passes through the filter and is reflected back out for a second pass through the filter. Each pass attenuates the sunlight. The effective peak transmission of sunlight by the broad band filter is 27% at 520 nm with a FWHM of 50 nm. The effective peak transmission of sunlight by the narrow band filter is 2.5% at 548 nm with a FWHM of 20 nm.

The incandescent lamp was replaced with a fluorescent lamp that had a phosphor that emitted light centered at 540 nm with a width of 15 nm. This constituted the narrow band light source. However, other narrow band sources would work. An example of another such source would be an electrical discharge in an atomic vapor or gas that emits light in a line coincident with the narrow band filter's transmission.

To test the ability of the invention to reduce sun glare, a solar simulator was constructed. It consisted of a 500 watt PAR lamp arranged such that it shone on the traffic light. It was placed at 20° in the horizontal plane and +10° in the vertical plane. The reflected glare light was measured at 0° in the horizontal plane and −10° in the vertical plane, which is essentially where a motorist would be located. With the original green filter, the glare was bright, yielding 692 relative units. For the narrow band filter, the result was 133 relative units. For a fair comparison, the glares were normalized to peak transmission. That yields 15.0 and 8.3 relative units for the broad band and narrow band filters, respectively. The narrow band thus yields a glare only 55% that of the broad band filter, or a 45% reduction. Similar results were obtained with different viewing angles and different solar simulator angles.

The equation [I] below describes the improvement to be gained in the preferred embodiment. The glare ratio R is the quotient of the glare from the narrow band filter and the broad band filter. In this equation, $S(\lambda)$ is the spectrum of the sun, $T_{nb}(\lambda)$ is the transmission of the narrow band filter that will yield lessened glare, and $T_{bb}(\lambda)$ is the transmission spectrum of the broad band filter currently in use on traffic lights. The peak transmission of the narrow band transmission curve has been normalized to the peak transmission of the broad band transmission curve. The transmission functions each appear twice, accounting for the sunlight's two passes through the filters. $P(\lambda)$ is he photopic response of the human eye.

Substituting the spectrum of the sun, the filter transmission functions, and the photopic curve as described above for the preferred embodiment into equation [I] yields R=0.316. This means that the glare has been reduced to 32% of its original magnitude, or it has been reduced by 68%. The experiment described above yielded a reduction of 45%. The calculation does not account for the smaller contributions to glare from the first and second surface reflections from the filter, which would tend to cause the experimental value to be greater than that predicted by equation [I]. The glare ratio can be made arbitrarily small by reducing the band pass of the filter and the light source.

$$R = \frac{\int_{-\infty}^{\infty} S(\lambda) \times T_{nb}(\lambda) \times P(\lambda) d\lambda}{\int_{-\infty}^{\infty} S(\lambda) \times T_{bb} \times T_{bb}(\lambda) \times P(\lambda) d\lambda} \quad [I]$$

The general criterion of the present invention is a glare reduction of at least 40% and preferably by 50% or more. Glare reduction as used herein means (1−R) as applied to all light display systems coping with unwanted external light sources competing with internal light sources of the systems.

Other embodiments of the present invention would have light sources other than fluorescent. The light source need only emit in a narrow band that matches the narrow band filter. Examples of other light sources are high and low pressure sodium lamps, metal halide lamps, high pressure mercury lamps, neon and other gas discharge lamp, and light emitting diodes.

Consistent with the present invention, the light source may have a wide spectral line, or it may be an assemblage of individual narrow lines that cover a broad area, or it may be continuous as with an incandescent source. The narrow band filter will absorb the emission that does not match its transmission, thus lowering the efficiency of the system, but the sun glare reduction will still occur.

The filter will reduce the glare from the sun and the light from the incandescent bulb by equal amounts. This does not improve glare. But the loss of the incandescent bulb can be compensated by supplying more power to the bulb, improving the glare conditions. The benefit of this method is that it reduces the glare from the sun and allows the luminous intensity of the traffic light to be maintained. A similar glare improvement can be gained without an additional filter, by simply using brighter incandescent bulbs. However, at some point the traffic signal will be uncomfortably bright to motor vehicle operators, thus creating a new safety hazard.

Figure 1B:
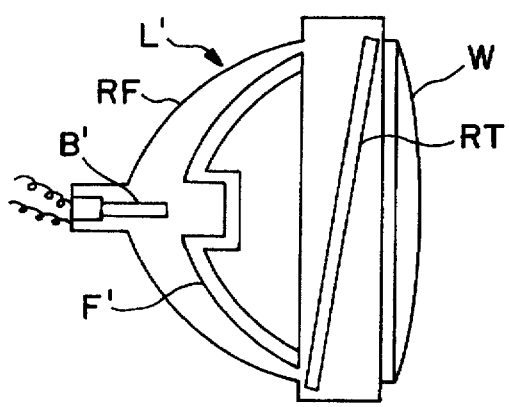
FIGS. 1B, 1C are cross-sectional views of traffic lights modified as compared to the FIG. 1 light.

In another embodiment of the invention, the filter may be placed in another location on the traffic fixture. The filter may also be placed anywhere such that the lamp light and the sunlight both pass through it. It may be used to cover the reflector, or it could appear as an interior baffle as shown in FIG. 1B where a modified lamp L' has a reflector RF, narrow band light source B,' reticule RT and narrow band filter F' with a window W that can be transparent to a wide band of light or be constructed to act as a further filter.

In another embodiment of this invention, the filter could be of a type other than an absorbing transmission filter. It may be an interference filter, or it may be a reflector that absorbs or transmits undesired wavelengths.

In another embodiment of the invention, a combination of filters with different transmissions may be used to achieve reduced sun glare.

Figure 1C:
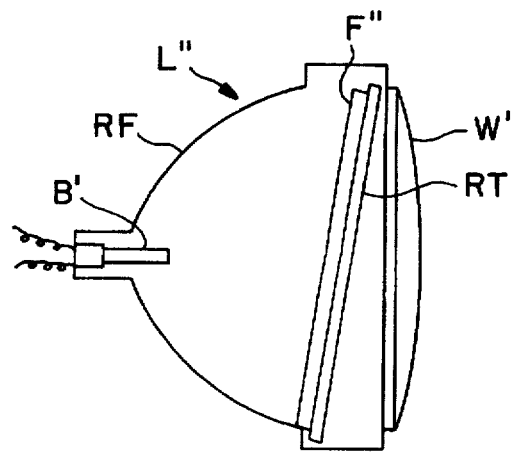

In another embodiment of the invention, a combination of filters with the same transmissions or a thicker filter may be used to achieve reduced sun glare. By using several filters or a thicker filter, the effective narrowness of the filter is increased. FIG. 1C illustrates an example of multiple filtering in a lamp L" that has a reflector RF, narrow band light source B', reticule RT and a primary filter W' and secondary filter F".

In another embodiment of the invention, the filter can have two or more narrowly transmissive regions to allow two or more wavelengths of light to pass through. This would also allow more glare, but it would allow more flexibility in tailoring the color of the traffic light. Example: if a pure, single line color is not desired or does not meet a safety standard, two pure colors can be mixed to make a specified color.

In another embodiment of the invention, the technique may be applied to applications other than traffic lighting. Examples include pedestrian crosswalk signs, graphic and alphanumeric display lighting directions in public outdoor and indoor areas with strong external light (including but not limited to sunlight), airport runway lighting (with runway directions), nautical signals and advertising displays.

The glare can be generated by a source other than the sun. Sources may include artificial indoor or outdoor lighting, automobile headlamps, visible radiation from furnaces, and light resulting from combustion or electrical discharges, or biological sources of light.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

What is claimed is:

1. Light display system comprising:
   (a) means defining a narrow band light source with FWHM of under 55 nm;
   (b) means defining an enclosure for said source and at least one viewing aperture of the enclosure;
   (c) means defining a filter in operative relation to the aperture to pass high intensity light (relative to light source (a)) from a source outside the enclosure to within the enclosure and to intercept light re-emerging from the enclosure and in each pass of entering and re-emergent light filtering the entering and re-emergent light to substantially block spectral portions thereof that are not within the narrow band of said light source (a) but to pass spectral portions that are within said narrow band.

2. Light display system in accordance with claim 1 constructed and arranged as a traffic light with multiple sources of narrow band light, and associated enclosure means, viewing apertures and filters.

3. Light display system in accordance with either of claims 1 or 2 with a glare reduction of at least 40%.

4. Light display system in accordance with claim 3 with a glare reduction of at least 50%.

5. Light display system in accordance with claim 1 with the filter disposed essentially within the viewing aperture of the enclosure.

6. Light display system in accordance with claim 1 wherein the filter is an aperture window.

7. Light display system in accordance with claim 6 wherein an additional filter is provided within the enclosure.

8. Light display system in accordance with claim 1 wherein a focussing reflector is provided and a filter element is provided adjacent said reflector.

9. Light display system comprising (1) light source means, and (2) color filter means for selective display of a color corresponding to the filter, for use in an environment exposed to strong glare generating wide band ambient light, the improvement wherein the light source and filter are selected for a common narrow band range, substantially narrower than the said ambient source and with essentially common peaks.

10. Light display system in accordance with claim 9 constructed as a distinct color light of a traffic signal with at least one said color filter therein of the distinct color and said narrow band light source also selected for such color and having a FWHM of under 55 nm, the filter being arranged to intercept sunlight in at least one pass, whereby sunlight induced glare is suppressed.

11. Light display system in accordance with claim 10 as a multi-light traffic signal with each of multiple lights having distinct matching color assignment of their respective filters and light sources.

12. Light display system in accordance with either of claims 10 or 11 wherein the light has reflector means therein reflecting light from said source and directing said light through the same filter that intercepts sunlight.

13. Light display system in accordance with claim 12 wherein the reflector and filter are positioned so that the filter intercepts sunlight twice, once as said light enters the system and once as said light exits the system after being reflected by said reflector means.

* * * * *